(12) United States Patent
Chavez

(10) Patent No.: US 8,500,161 B2
(45) Date of Patent: Aug. 6, 2013

(54) KNEE AIRBAG

(75) Inventor: Spencer W. Chavez, Linden, MI (US)

(73) Assignee: TK Holdings Inc., Auburn Hills, MI (US)

( * ) Notice: Subject to any disclaimer, the term of this patent is extended or adjusted under 35 U.S.C. 154(b) by 45 days.

(21) Appl. No.: 13/073,938

(22) Filed: Mar. 28, 2011

(65) Prior Publication Data

US 2011/0241319 A1 Oct. 6, 2011

Related U.S. Application Data

(60) Provisional application No. 61/319,630, filed on Mar. 31, 2010.

(51) Int. Cl.
*B60R 21/206* (2011.01)
*B60R 21/2338* (2011.01)

(52) U.S. Cl.
USPC ..................... 280/730.1; 280/743.2

(58) Field of Classification Search
USPC .......................... 280/730.1, 732, 743.1, 743.2
IPC ....................................... B60R 21/206,21/2338
See application file for complete search history.

(56) References Cited

U.S. PATENT DOCUMENTS

| | | | | |
|---|---|---|---|---|
| 5,536,043 A | * | 7/1996 | Lang et al. ..................... | 280/753 |
| 5,931,493 A | * | 8/1999 | Sutherland ................. | 280/730.1 |
| 6,155,595 A | * | 12/2000 | Schultz ........................ | 280/729 |
| 6,416,079 B1 | * | 7/2002 | Lutz et al. .................. | 280/730.1 |
| 6,431,583 B1 | * | 8/2002 | Schneider .................. | 280/728.2 |
| 6,464,255 B1 | * | 10/2002 | Preisler et al. ................. | 280/752 |
| 6,631,920 B1 | * | 10/2003 | Webber et al. ............. | 280/730.1 |
| 6,685,217 B2 | * | 2/2004 | Abe ........................... | 280/730.1 |
| 6,715,789 B2 | * | 4/2004 | Takimoto et al. ........... | 280/730.1 |
| 6,817,627 B2 | * | 11/2004 | Galmiche et al. ........... | 280/730.1 |
| 6,916,039 B2 | * | 7/2005 | Abe .............................. | 280/729 |
| 6,942,245 B2 | * | 9/2005 | Takimoto et al. ........... | 280/730.1 |
| 7,048,298 B2 | * | 5/2006 | Arwood et al. ............. | 280/730.1 |
| 7,090,245 B2 | * | 8/2006 | Yoshikawa et al. ........... | 280/729 |
| 7,213,840 B2 | * | 5/2007 | Kumagai ...................... | 280/752 |
| 7,314,231 B2 | * | 1/2008 | Abe et al. .................... | 280/730.1 |
| 7,322,598 B2 | * | 1/2008 | Galmiche et al. ........... | 280/730.1 |
| 7,393,011 B2 | * | 7/2008 | Keshavaraj ................. | 280/743.2 |
| 7,434,837 B2 | * | 10/2008 | Hotta et al. ................. | 280/743.2 |

(Continued)

FOREIGN PATENT DOCUMENTS

| | | | |
|---|---|---|---|
| JP | 2004291888 A | * | 10/2004 |
| JP | 2004352037 A | * | 12/2004 |
| JP | 2005096654 A | * | 4/2005 |

*Primary Examiner* — Joseph Rocca
*Assistant Examiner* — Laura Freedman
(74) *Attorney, Agent, or Firm* — Foley & Lardner LLP

(57) ABSTRACT

A knee airbag module can include a knee airbag cushion and a deployment control mechanism, with the deployment control mechanism limiting displacement of the knee airbag cushion in at least a vertical direction relative to a vehicle. The deployment control mechanism can induce an airbag cushion to deploy in a direction rearward (relative to a front of a vehicle) and oblique along a vehicle dashboard quickly by controlling and limiting the downward deployment distance and making the rearward and oblique direction become a path of least resistance for deployment of the knee airbag cushion. In addition, the airbag module and the deployment control mechanism can permit a knee airbag cushion to provide enhanced coverage of an occupant's leg, such as above the knee of the occupant's leg, by controlling the deployment of the knee airbag cushion without the need to use an airbag cushion with a greater vertical height.

17 Claims, 4 Drawing Sheets

U.S. PATENT DOCUMENTS

| | | | |
|---|---|---|---|
| 7,452,002 B2 * | 11/2008 | Baumbach et al. | 280/743.2 |
| 7,571,929 B2 * | 8/2009 | Fukawatase et al. | 280/730.1 |
| 7,766,374 B2 * | 8/2010 | Abele et al. | 280/730.1 |
| 7,798,521 B2 * | 9/2010 | Bito | 280/730.1 |
| 2005/0046158 A1 * | 3/2005 | Abe | 280/730.1 |
| 2005/0151351 A1 * | 7/2005 | Enders et al. | 280/730.1 |
| 2007/0246920 A1 * | 10/2007 | Abele et al. | 280/730.1 |
| 2008/0217887 A1 * | 9/2008 | Seymour et al. | 280/728.2 |

* cited by examiner

KNEE AIRBAG

CROSS REFERENCE TO RELATED APPLICATIONS

This application claims priority to and the benefit of U.S. Provisional Patent Application Ser. No. 61/319,630 filed on Mar. 31, 2010. The foregoing provisional application is incorporated by reference herein in its entirety.

BACKGROUND

The present application relates generally to the field of knee airbags for use in motor vehicles. More specifically, this application relates to a knee airbag having a deployment control mechanism to tailor deployment to limit the downward travel of the deploying cushion to improve occupant restraint.

SUMMARY

According to an example, a knee airbag module can include a knee airbag cushion and a deployment control mechanism. The deployment control mechanism can limit deployment of the knee airbag cushion in a vertical direction relative to a vehicle.

DETAILED DESCRIPTION

Figure 1:
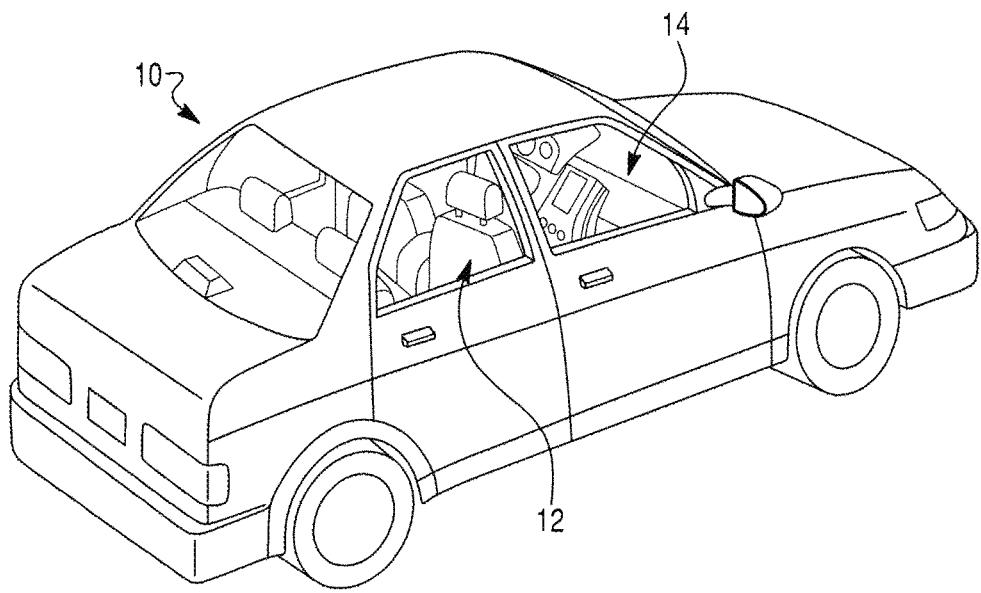
FIG. 1 is a perspective view of an example of a motor vehicle, which includes a passenger compartment having an airbag module.

Knee airbags are generally known to provide a degree of protection to the legs of the occupant during a vehicle dynamic event. For example, knee airbags can deploy between a vehicle component, such as the dashboard, and the legs of the occupant, such as the tibia of an occupant's leg. Knee airbags typically are configured to protect at least to a degree, upon deployment, the lower legs (e.g., the tibia and fibula), the knee region (e.g., the patella), and a portion of the upper leg (e.g., femur) extending from the knee region towards the torso of a vehicle occupant. Knee airbags provide at least a degree of protection to an occupant by substantially preventing the occupant from impacting a surface of the vehicle or a component of the vehicle, such as the dashboard of the vehicle, with a high acceleration. Such surfaces and components often have high stiffness (i.e., resistance to deformation), and impacts between the occupant and such surfaces and components at high accelerations would induce high forces to the legs of the occupant. Additionally, the high stiffness of the vehicle components and surfaces tend to create a stress concentration which is local to a first surface of the vehicle or vehicle component contacted by the occupant, which may cause increased injury to the occupant due to the high forces imparted by the stress concentration. Knee airbags allow the occupant to impact the airbag instead of the vehicle component, which decelerates the occupant to induce relatively lower forces to the occupant and to distribute the impact forces across a larger surface area, which further reduce occupant injury.

Conventional knee airbags can be stored in and deployed from the dashboard or instrument panel of a vehicle. For example, conventional knee airbags can be located behind the dashboard so that the airbag deploys through a visible door or chute located on the surface of the dashboard. In comparison, a low mount knee airbag module can be mounted underneath the instrument panel with a cover that is pointed downwards to the floor of a vehicle so that the low mount knee airbag module and its cover or door are not visible to a vehicle occupant. The knee airbag of the low mount knee airbag module can deploy around a dashboard so that the knee airbag does not deploy through the dashboard, such as through a door or chute in the surface of the dashboard.

Knee airbag modules typically include an inflatable airbag cushion, an inflator to inflate the cushion, and a housing for coupling to the dashboard of the vehicle and for retaining the folded and stored cushion. However, conventional knee airbags, which mount to the bottom of the dashboard and deploy initially in a substantially downward direction from the airbag module, can have a reduced effectiveness by deploying too far in the downward direction towards the vehicle floor pan or the feet of a vehicle occupant. Airbags normally deploy by following the path of least resistance. Therefore, conventional knee airbags will deploy downward until resistance is met, which causes the cushion to deploy in a different direction. As a result, these conventional knee airbags require a longer time to deploy into a position between the occupant and dashboard, which is rearward and oblique along a rearward facing surface of the dashboard.

The knee airbags disclosed herein advantageously provide improved occupant protection by including a deployment control mechanism which limits the initial downward distance that the cushion may deploy. The deployment control mechanism can also force a cushion to deploy in a direction rearward and oblique along a rearward facing surface of a dashboard. By limiting the initial downward deployment of a cushion, the cushion can inflate in shorter period of time and thus properly be positioned between the lower legs of the occupant and the dashboard to cushion an impact experienced by the occupant.

With reference to FIG. 1, an example of a motor vehicle 10 is illustrated, which includes a passenger compartment 12 configured to have at least one vehicle occupant and a dashboard assembly 14. The dashboard assembly 14 may be configured to include a knee airbag module to provide a degree of occupant protection during events triggering airbag deployment, such as frontal or side vehicle dynamic impacts. Although the vehicle 10 illustrated in FIG. 1 is a conventional sedan, the airbag modules disclosed herein may be incorporated into any vehicle configured for at least one vehicle occupant.

Figure 2:
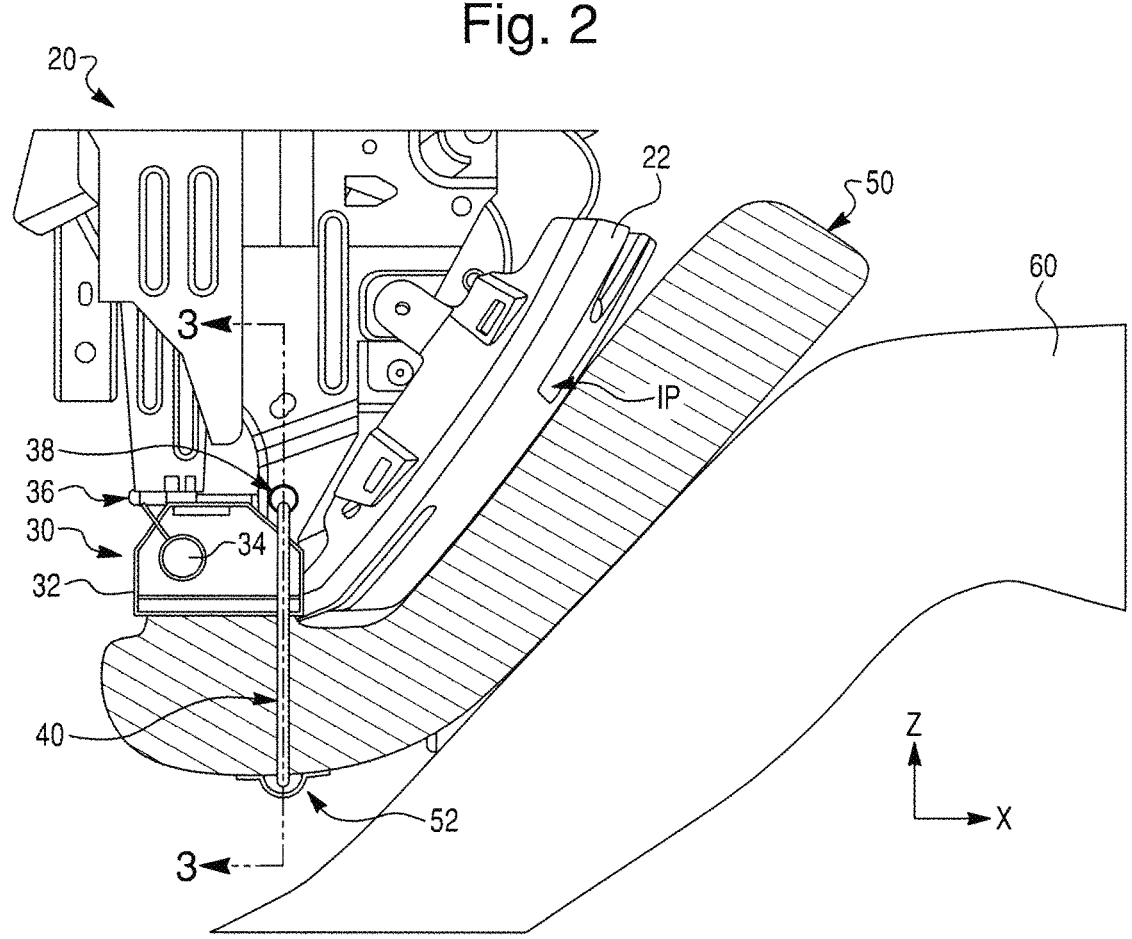
FIG. 2 is a side sectional view through the dashboard of a vehicle illustrating an exemplary airbag module deployed from a bottom side of the instrument panel.

FIG. 2 shows an example of a passenger compartment 20 of a vehicle. The passenger compartment can include a dashboard 22 (or instrument panel) and an occupant 60 seated in a seat assembly (seat assembly not shown). The dashboard 22 may include an airbag module 30 and include other utility devices, such as a glove-box. The dashboard 22 may include multiple airbag modules, such as an airbag module for a driver in a front driver seat assembly and an airbag module for a passenger in a front passenger seat assembly, and the airbag modules can be of different types. For example, the dashboard 22 may include a first airbag module (not shown) configured to deploy an airbag cushion to protect the thorax of an occupant and a second airbag module configured to deploy an airbag cushion to protect the legs of the occupant, the second airbag typically being known as a knee airbag. An exemplary embodiment of the knee airbag 50 is shown in the example of FIG. 2 in a deployed state between the dashboard 22 and the occupant 60, providing a degree of protection to the lower legs of the occupant.

According to an example, a knee airbag module 30 may include an inflatable cushion 50, an inflator 34 for inflating the cushion 50, a housing 32 which can house the inflator 34 and the inflatable cushion 50 in a folded, undeployed state. The housing 32 can be coupled to the dashboard to attach the knee airbag module 30 to the dashboard 22 of the vehicle, such as at a fixation point 36. The inflator 34 may be configured as a conventional pyrotechnic device, which upon being triggered, can rapidly generate inflation gas to inflate the airbag cushion during deployment. The housing 32 may be conventionally configured according to designs used in the art. The knee airbag module 30 can be used as a driver's side airbag module or as a passenger side airbag module.

Figure 5:
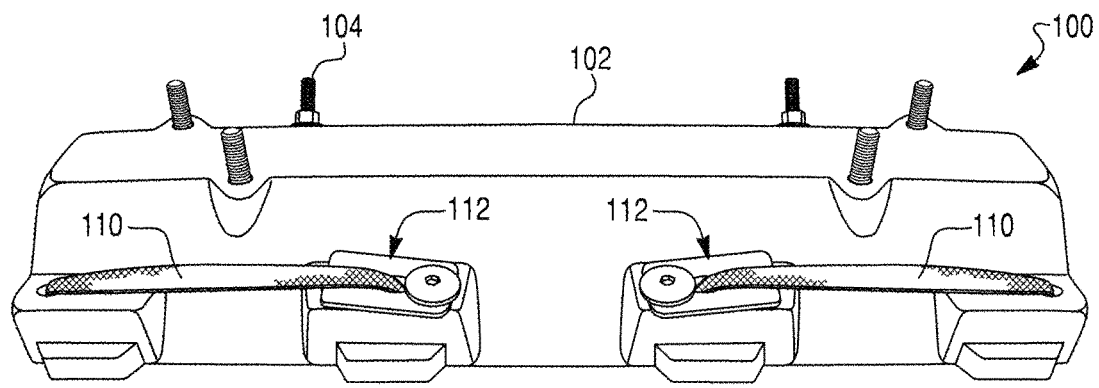
FIG. 5 is a perspective view of an example of an airbag module.

FIG. 5 shows an exemplary housing 102 which can be used in the knee airbag modules discussed herein, such as an airbag module 100 which includes the housing 102. In the example shown in FIG. 5, the housing 102 may be made from steel or any other material that is strong enough to withstand the relatively high forces (and often high temperatures) generated during airbag deployment. The housing 102 may include a plurality of fastening mechanisms 104 for coupling the housing 102, and therefore the airbag module 100, to a component of a vehicle, such as a dashboard. The fastening mechanisms 104 may be, for example, bolts, screws, or any suitable conventional fastener. The airbag module 100 can further include one or more deployment control mechanisms 110, which can be attached to the housing 102 at one or more locations 112.

Figure 6:
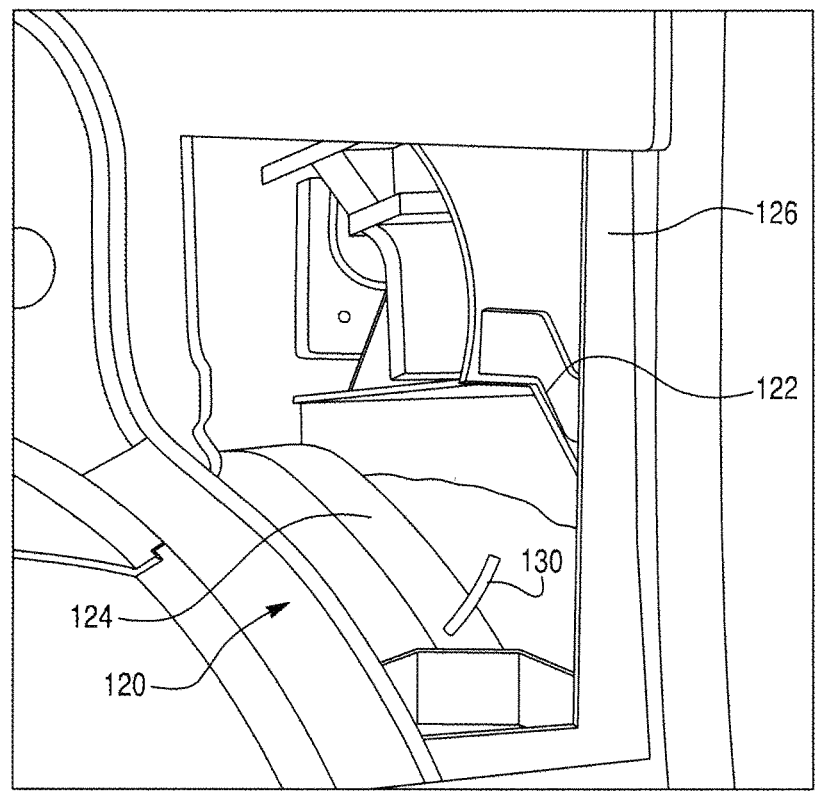
FIG. 6 is a side sectional view of a dashboard illustrating an airbag cushion within an exemplary airbag module deployed from a folded and stored configuration.

The knee airbag module 30 can be a low mount knee airbag module which deploys a knee airbag 50 which deploys around the dashboard 22 instead of through the dashboard, such as through a door or chute in the dashboard 22, as shown in the example of FIG. 2. In relation to conventional knee air modules, the knee airbag module 30 can have a hinge point which is shifted in a direction towards the rear of a vehicle, such as the most rearward edge of the knee airbag module 30 in relation to the front of a vehicle. FIG. 6 shows another example of a knee airbag module 120 which includes a housing 122, an airbag cushion 124, and a deployment control mechanism 130, with the knee airbag module 120 being installed forward of a dashboard 126, relative to a forward direction of a vehicle.

Figure 4:
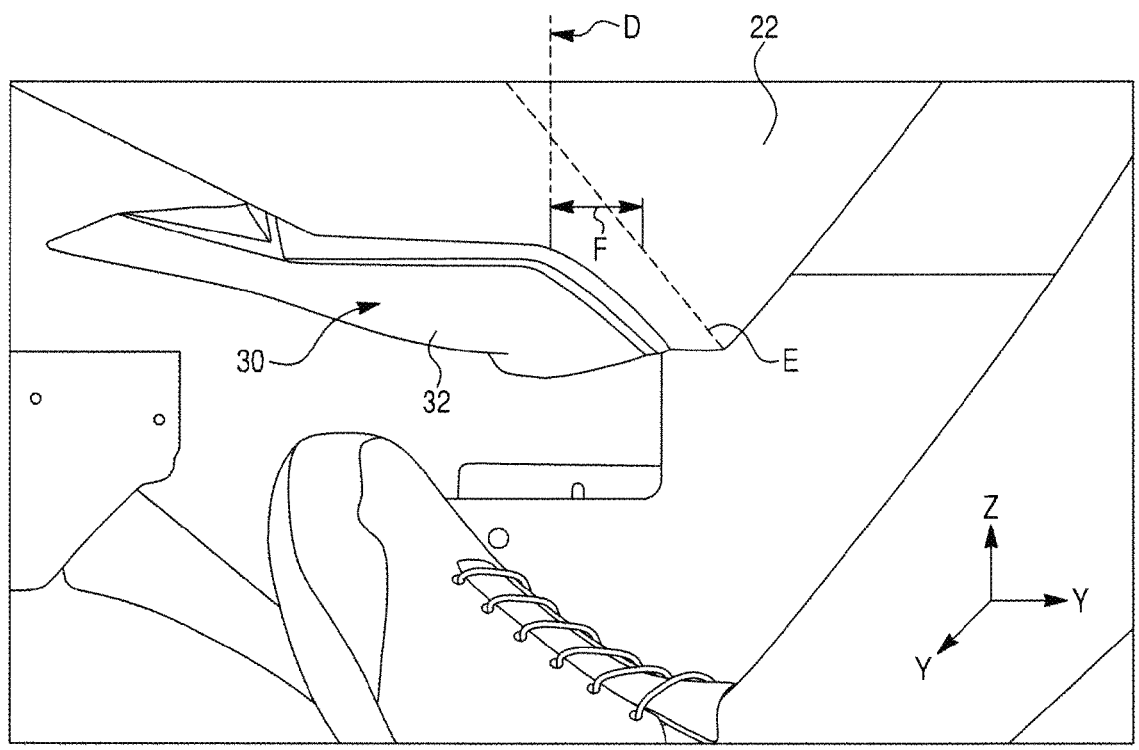
FIG. 4 is a perspective view of a lower portion of a dashboard illustrating an example of where the airbag module can be positioned.

FIG. 4 shows an example of the location of an exemplary knee airbag module 30 relative to a dashboard 22 of a vehicle. In the example of FIG. 4, the airbag module 30 is shown to be positioned with a forward offset, such as a forward offset F measured between an edge D of the airbag module 30 and an instrument panel 22 (or dashboard) hinge point E. The offset distance is typically driven by the inclusion of utility features in the dashboard 22, such as a glove-box.

The airbag module 30 can further include a deployment control mechanism 40, as shown in the example of FIG. 2. The deployment control mechanism 40 can be configured to limit the displacement of a deploying knee airbag cushion 50 in a downward direction towards the floor of a vehicle (i.e., in the Z direction in the example of FIG. 2). By limiting the deployment of the knee airbag cushion 50 in the downward direction, the knee airbag cushion 50 will reach a maximum, controlled downward distance that it may deploy due contact with the deployment control mechanism 40, which restricts further downward movement of the cushion 50. Upon reaching this maximum, controlled distance, the cushion 50 will then follow a path of least resistance and continue to deploy along its inflatable length towards the occupant so that the cushion 50 deploys and inflates along the dashboard 22, such as between the dashboard 22 and the occupant 60, as shown in the example of FIG. 2. For example, the maximum, controlled distance can be a predetermined distance relative to the knee airbag module. Such a predetermined distance can be determined in consideration of the model and geometry of a vehicle, the size of an occupant, and the size and geometry of a desired airbag cushion.

As a result, the deployment control mechanism 40 advantageously can induce an airbag cushion 50 to deploy in a direction rearward (relative to a front of a vehicle) and oblique along the dashboard 22 more quickly (relative to conventional cushions which would normally continue to deploy downward for a longer period of time) by controlling and limiting the downward deployment distance (such as in the Z direction of FIG. 2) and making the rearward and oblique direction become the path of least resistance for the cushion 50. This effect of the deployment control mechanism 40 also permits the knee airbag module 30 to be installed behind a dashboard 22 at a low position so that a knee airbag 50 deploys below and around the dashboard 22, as shown in the example of FIG. 2, instead of through a door or chute in the dashboard 22.

The deployment control mechanism 40 can be attached or connected to the vehicle or a vehicle component, such as at a fixation point 38 shown in the example of FIG. 2. According to another example, the deployment control mechanism 40 can be attached or connected to the knee airbag module 30, such as the housing 32 of the module. Having the airbag module deployment control mechanism 40 coupled towards the rearward edge of the module 30 (as shown in the example of FIG. 2) reduces a deployment time by having a faster transition from downward deployment to rearward and oblique deployment.

Figure 7:
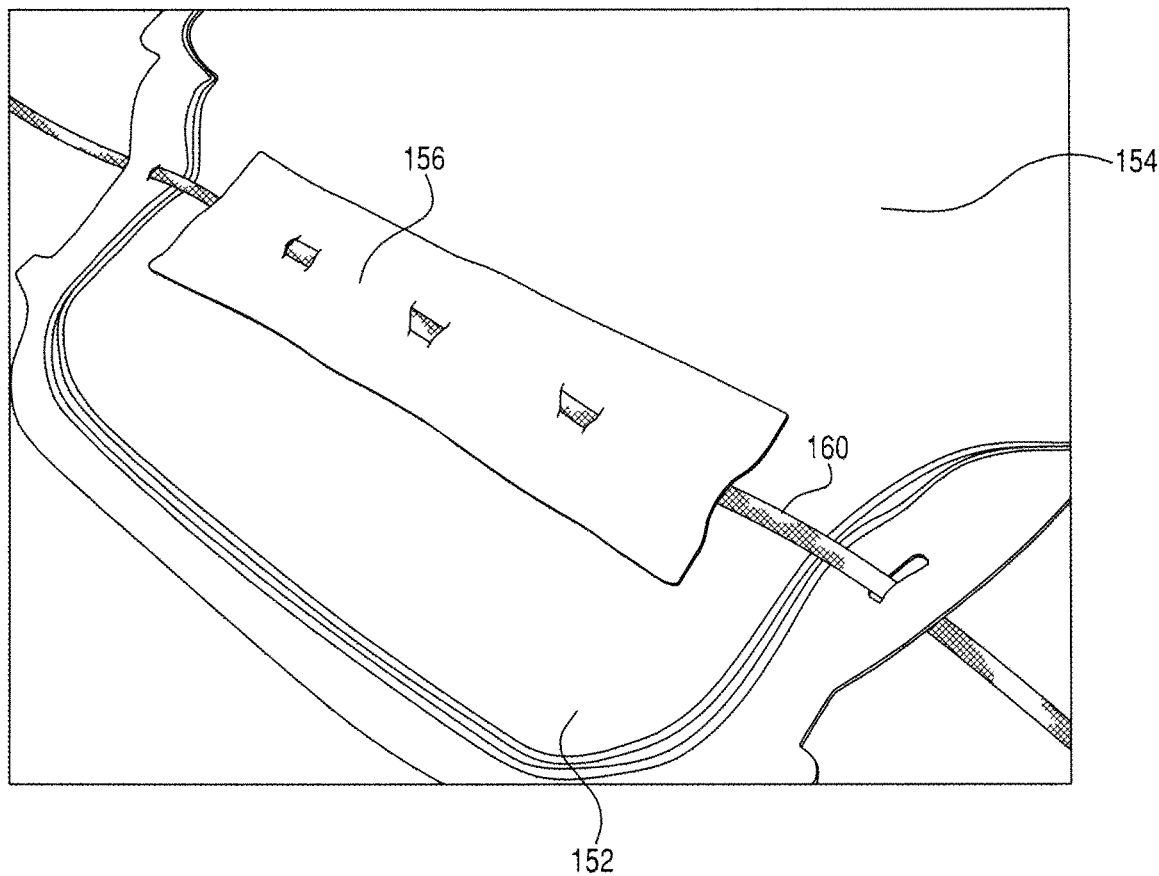
FIG. 7 is a perspective view of an exemplary deployment control mechanism of an airbag module routed through a retention mechanism of an airbag cushion.

The airbag cushion may be made from one or a plurality of fabric panels coupled together through conventional methods (e.g., stitching) to form at least one inflatable chamber or portion. The airbag cushion may further include a retention mechanism to connect the deployment control mechanism to the airbag cushion. An example of such a retention mechanism 52 of an airbag 50 is shown in FIG. 2. FIG. 7 shows another example of an airbag cushion 152 having an inflatable portion 154 and a retention mechanism 156 for a deployment control mechanism 160. The retention mechanism 156 may be, for example, a separate fabric panel coupled to the airbag cushion 152 through stitching, to form a shape to retain the deployment control mechanism 160 so that the deployment control mechanism 160 is connected to the airbag cushion 152. For example, the retention mechanism 156 may form a U-shaped channel, so when coupled to the airbag cushion 152 the retention mechanism 156 forms a closed passage for the deployment control mechanism 160 to pass through and retain the deployment control mechanism 160, such as shown in the example of FIG. 7.

Figure 3:
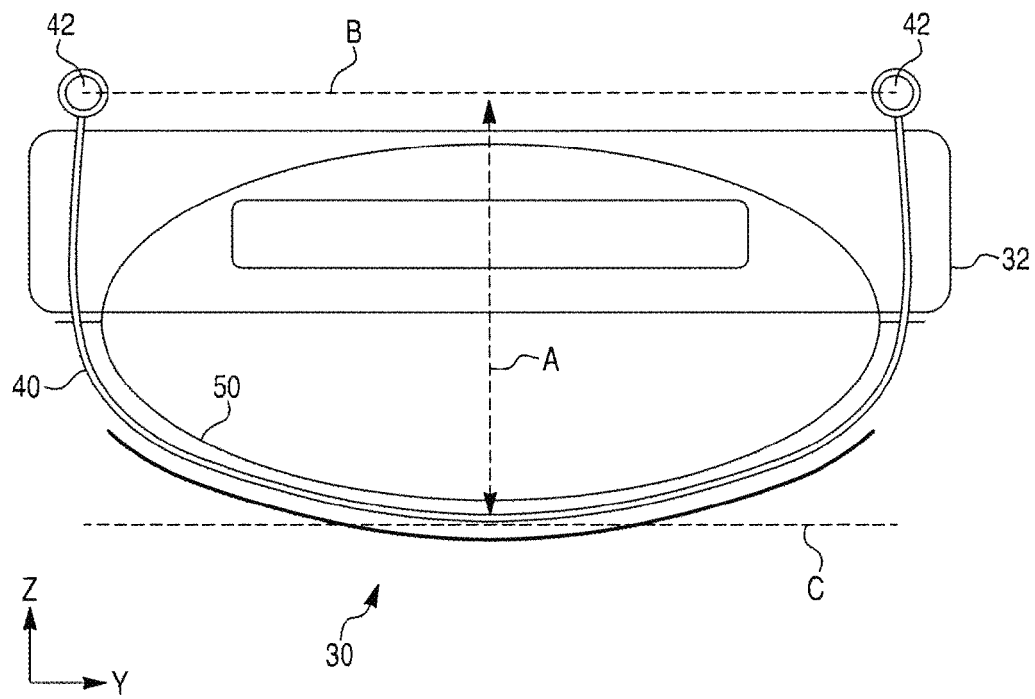
FIG. 3 is a side sectional view of the airbag module, taken along line 3-3 of FIG. 2, illustrating a configuration of the deployment control mechanism.

FIG. 3 shows an example of a knee airbag module 30 of FIG. 2 as viewed from the side and towards the front of a vehicle. As shown in the example of FIG. 3, the deployment control mechanism 40 can have a first end and a second end fixed to the vehicle, a vehicle component, or the airbag module at locations 42. When such plural fixing locations 42 are provided, they can be arranged along an attachment plane B, as shown in the example of FIG. 3. When the knee airbag cushion 50 is deployed, the deployment control mechanism 40 will act to limit downward deployment of the cushion 50 to an airbag excursion plane C which is a distance A from the attachment plane B. Further, the fixing locations 42, whether they be attachments to the vehicle, a vehicle component, or a knee airbag module, can be the only fixing locations for the deployment control mechanism 40, besides any connection or attachment between the deployment control mechanism and the airbag cushion 50.

According to an example, the deployment control mechanism may be coupled externally to an airbag cushion, as shown in the examples of FIGS. 2, 3, and 7. A portion of the deployment control mechanism may route through the retention mechanism of the airbag cushion, such that the deployment control mechanism may slide along the length of the channel (substantially along the y-axis of FIGS. 2 and 3), but is retained by the channel cross section (i.e., the deployment control mechanism remains fixed to the channel substantially in the directions of the z-axis and x-axis of FIGS. 2 and 3). As a result, the deployment control mechanism can be connected to a knee airbag cushion without having the deployment control mechanism itself being directly sewn to the airbag cushion or otherwise directly attached to the airbag cushion. Thus, the deployment control mechanism is free to move relative to the airbag cushion and its position adjusted while the airbag cushion is deployed in a downward direction until slack in the deployment control mechanism is removed and the deployment control mechanism limits further downward deployment of the airbag cushion. The amount of downward deployment permitted by the deployment control mechanism can be varied by controlling the length of the deployment control mechanism.

In another example, the deployment control mechanism 40 can be provided internally to the knee airbag cushion 50, such as by providing a connection, such as a retention mechanism 52, between the knee airbag cushion 50 and the deployment control mechanism 40 on an interior surface of the cushion 50.

The deployment control mechanism may route through a retention mechanism positioned on a bottom surface of an airbag cushion, such that the deployment control mechanism may route from the first end along the right-side of the cushion, along the bottom profile of the cushion, then along the left-side of the cushion to the second end of the control mechanism. The first and second ends may be configured to include fixing locations for the deployment control mechanism. According to an exemplary embodiment, the fixing locations of the first and second ends may be a loop (as shown in FIG. 3) configured to be fixed to the housing by any suitable conventional fastener (as shown in FIG. 5). The fixing locations may be configured as any suitable geometry, such as being apertures. The housing of the module being structural, react the tension forces in the deployment control mechanism that pass from the first and second ends of the deployment control mechanism to the housing, during airbag deployment.

According to another example, the retention mechanism may be formed from a portion of the inflatable airbag cushion. For example, the airbag cushion may be folded over to form an extension that may be stitched to an adjacent portion of the cushion to form a channel or closed passage for the deployment control mechanism to pass through. The retention mechanism may have a configuration not disclosed herein and can be provided as a single retention mechanism or a plurality of separate retention mechanisms. The retention mechanism ensures that the deployment control mechanism remains in the proper position (primarily in the fore-aft direction) relative to the airbag cushion of a knee airbag module, so that the downward deployment of the airbag cushion may be controlled (e.g., limited) by the deployment control mechanism.

According to an example, the deployment control mechanism may be a strap, such as a strap made from a material (e.g., high strength nylon, airbag fabric) structurally configured to withstand the tensile forces induced by the deploying airbag cushion. The deployment control mechanism may be configured to remain in place, particularly relative to the airbag cushion, throughout the entire deployment process, so that the deployment control mechanism controls the distance the cushion deploys in the downward direction, then upon the cushion reaching the control distance determined by the deployment control mechanism, the deployment control mechanism prohibits additional downward deployment. During deployment, airbags have the tendency to take the path of least resistance, therefore without the deployment control mechanism, the cushion would normally continue to deploy downward until resistance is met, often, in the form of the feet of an occupant or possibly the floor of a vehicle, particularly for a low mount knee airbag. Thus, the deployment control mechanism advantageously induces an airbag cushion to deploy in a direction rearward (relative to a front of a vehicle) and oblique along the dashboard more quickly (relative to conventional cushions which would normally continue to deploy downward for a longer period of time) by controlling and limiting the downward deployment distance and making the rearward and oblique direction become the path of least resistance. In addition, the airbag module and the deployment control mechanism permit a knee airbag cushion to provide enhanced coverage of an occupant's leg, such as above the knee of the occupant's leg, by controlling the deployment of the knee airbag cushion without the need to use an airbag cushion with a greater vertical height.

In another example, the deployment control mechanism can be connected to an airbag such that a retention mechanism is not necessary. For example, the deployment control mechanism can be sewn directly to an airbag cushion such that the retention mechanism is eliminated. In another example, the deployment control mechanism can be simply routed along the exterior of an airbag cushion without fastening the deployment control mechanism to the airbag cushion.

The effectiveness of the deployment control mechanism to control the downward deployment distance of the airbag cushion may be varied by tailoring various parameters, such as the location of the deployment control mechanism on the airbag cushion and the length of the deployment control mechanism. According to an example, the deployment control mechanism may be configured to route through a retention mechanism 52 of the airbag cushion in a substantially vertical direction, as shown in FIG. 2. The deployment control mechanism may be positioned at the rearward portion (relative to the front of a vehicle) of an airbag module to change a hinge point of the cushion during deployment to be further rearward and to induce quicker transition from the downward deployment of the cushion (to escape the housing of the module) into rearward and oblique deployment of the cushion along the dashboard. According to other exemplary embodiments, the deployment control mechanism may route through the retention mechanism from the fixing locations in an oblique direction, where the retention mechanism may be forward or rearward of the fixing locations. The length of the deployment control mechanism may be tailored based on the configuration of the dashboard, the position of the airbag module relative to the dashboard, and other vehicle parameters. The length of the deployment control mechanism can be tailored to allow enough downward deployment of the airbag cushion to clear the airbag module (e.g., housing) and the dashboard, so that the rearward deployment of the airbag cushion is not impeded by the dashboard or housing, but minimizes excess downward deployment to drive the airbag rearward, shortening the time required for the cushion to deploy between the dashboard and occupant.

The deployment control mechanisms discussed herein can limit displacement of a deploying knee airbag cushion in at least a vertical or downward direction. Such deployment control mechanisms can limit the displacement of a deploying knee airbag cushion such that the deployment control mechanism limits the displacement of the knee airbag cushion in both a vertical direction and a horizontal direction (including a direction having a vertical component and a horizontal component), or in only a vertical direction. According to another example, the displacement control mechanisms described herein can limit displacement of a deploying knee airbag cushion in only a horizontal direction or in both horizontal and vertical directions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbags as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A knee airbag module, comprising:
an inflatable cushion,
a deployment control mechanism,
wherein the deployment control mechanism limits displacement of the cushion during deployment in at least a downward vertical direction relative to a vehicle so that the cushion deploys upwardly in a vertical direction, and
wherein the deployment control mechanism extends under the cushion and upward relative to the vehicle along portions of opposing sides of the cushion during deployment, the opposing sides of the cushion being spaced apart in a direction perpendicular to a direction of movement of the vehicle.

2. The knee airbag module of claim 1, wherein the cushion is a knee airbag cushion and wherein the deployment control mechanism is connected to the knee airbag cushion.

3. The knee airbag module of claim 2, wherein the deployment control mechanism is a strap that is connected to an exterior surface of the knee airbag cushion.

4. The knee airbag module of claim 3, wherein the strap is coupled at each end to the vehicle or a housing of the knee airbag module.

5. The knee airbag module of claim 3, wherein the strap extends entirely across the inflatable cushion in a transverse direction relative to a front of the vehicle.

6. The knee airbag module of claim 3, wherein the strap is coupled to a bottom portion of the inflatable cushion with a retention mechanism that allows the strap to slide relative to the inflatable cushion.

7. The knee airbag module of claim 2, wherein the deployment control mechanism is connected to the knee airbag cushion by a channel on a surface of the knee airbag cushion which the deployment control mechanism passes through.

8. The knee airbag module of claim 1, wherein the cushion is a knee airbag cushion and wherein the deployment control mechanism is configured to be attached to the vehicle which the knee airbag module is installed in or attached to a component of the vehicle.

9. The knee airbag module of claim 1, wherein the cushion is a knee airbag cushion and wherein the knee airbag module is configured to be installed forward of a dashboard of the vehicle relative to a forward direction of the vehicle such that the knee airbag cushion is deployed around the dashboard of the vehicle.

10. The knee airbag module of claim 1, wherein the cushion is a knee airbag cushion and wherein the deployment control mechanism limits the displacement of the cushion to a predetermined distance relative to the knee airbag module.

11. The knee airbag module of claim 1, wherein the deployment control mechanism extends along the entirety of the underside in a horizontal direction relative to the vehicle.

12. The knee airbag module of claim 1, wherein the deployment control mechanism continuously extends in the vertical direction along a first side of the cushion and a second side of the cushion that is substantially parallel to the first side.

13. The knee airbag module of claim 1, wherein the deployment control mechanism comprises a U-shape.

14. The knee airbag module of claim 1, wherein the deployment control mechanism engages a retention mechanism that extends along the underside.

15. The knee airbag module of claim 1 further comprising a housing in which the inflatable cushion is positioned prior to deployment, wherein an opening of the housing through which the inflatable cushion deploys faces substantially downward relative to the vehicle.

16. The knee airbag module of claim 1 further comprising a housing having an opening through which the inflatable cushion deploys, wherein the deployment control mechanism extends upward from the sides of the inflatable cushion to above at least a portion of the opening to be fixedly coupled to the vehicle or the housing.

17. The knee airbag module of claim 1, wherein the airbag module is positioned forward of a dashboard of the vehicle, and the inflatable cushion deploys below and around the dashboard.

* * * * *